United States Patent [19]

Dauberger

[11] 4,044,908
[45] Aug. 30, 1977

[54] COVER FOR ELECTRICAL FLOOR BOXES
[75] Inventor: George R. Dauberger, Pittsburgh, Pa.
[73] Assignee: Midland-Ross Corporation, Cleveland, Ohio
[21] Appl. No.: 645,683
[22] Filed: Dec. 31, 1975
[51] Int. Cl.² .............................................. H02G 3/08
[52] U.S. Cl. ..................................... 220/3.8; 174/66; 220/3.94; 220/241
[58] Field of Search ...................... 220/3.8, 3.92, 3.94, 220/241, 242, 266, 284, 306, 307, 4 E; 174/48, 66

[56] References Cited
U.S. PATENT DOCUMENTS

| 1,914,011 | 6/1933 | Eccles | 220/3.8 X |
| 2,800,242 | 7/1957 | Sauthoff | 220/3.8 |
| 2,907,927 | 10/1959 | Fisher | 220/3.8 X |
| 3,187,922 | 6/1965 | Hoskins et al. | 220/3.8 X |
| 3,424,341 | 1/1969 | Slapnik | 220/306 |
| 3,438,534 | 4/1969 | Zerwes | 220/241 |
| 3,729,572 | 4/1973 | Helin | 174/66 |
| 3,858,755 | 1/1975 | Tellen | 220/284 |

Primary Examiner—Stephen Marcus
Attorney, Agent, or Firm—H. Duane Switzer

[57] ABSTRACT

A support member on an electrical floor box or the like includes an opening receiving a cover formed in two parts having mating walls defining a joining line extending across the opening. The outer peripheral walls of the cover parts on opposite sides of the joining line have outwardly extending detents releasably received in recesses in the support member. The outer surfaces of the cover parts have rabbets formed therein adjacent the opposite ends of the joining line, and abutments on the support member are received in the rabbets.

7 Claims, 9 Drawing Figures

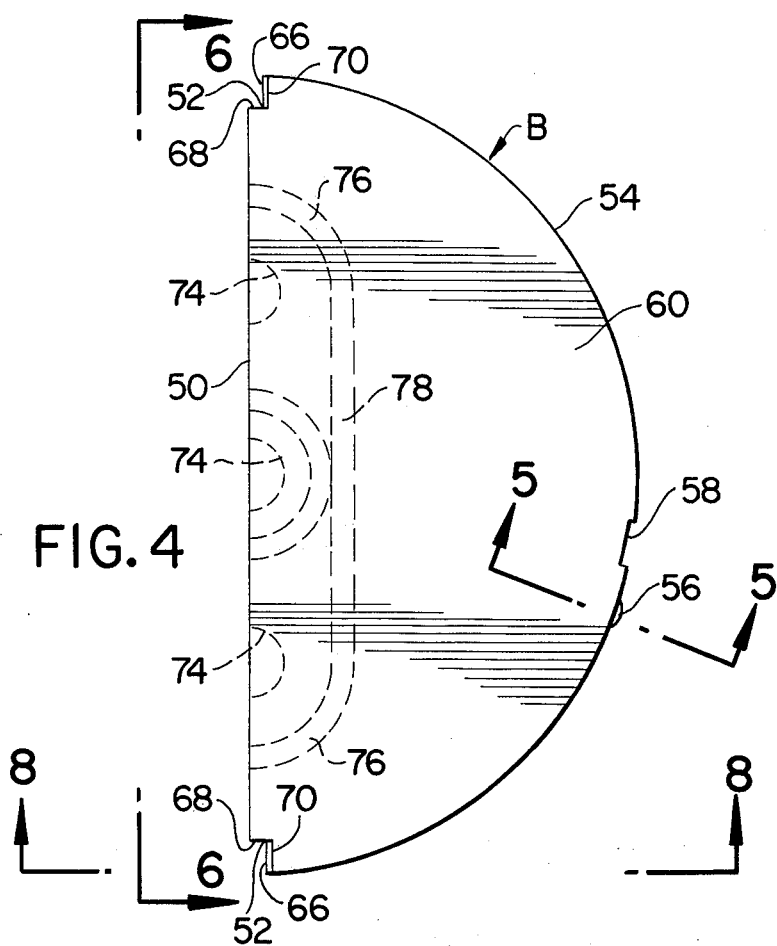
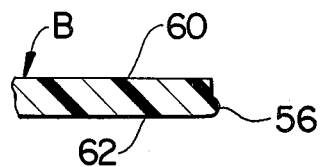
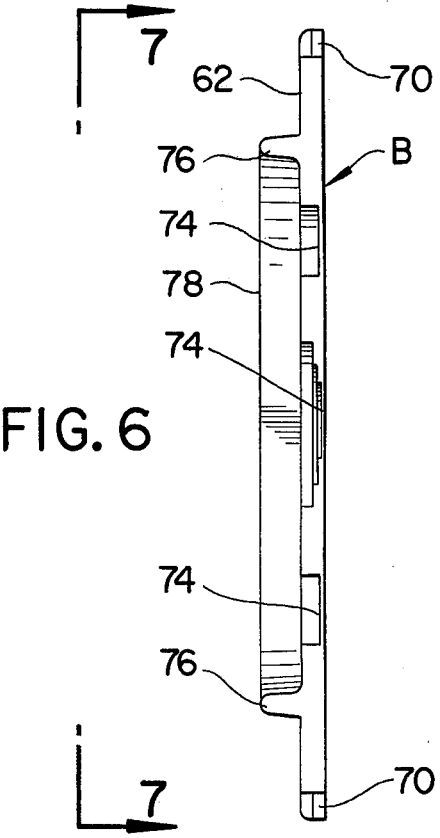
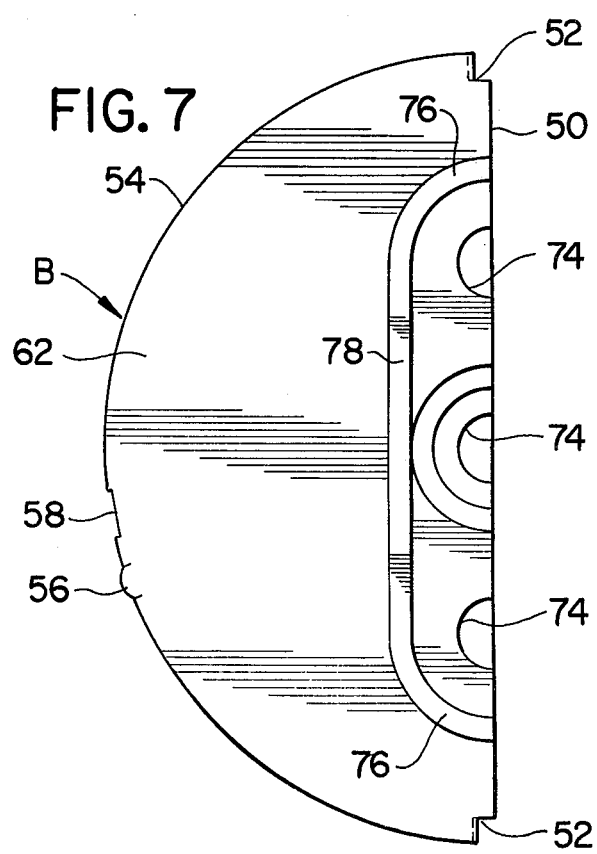

COVER FOR ELECTRICAL FLOOR BOXES

BACKGROUND OF THE INVENTION

This application relates to the art of covers and, more particularly, to covers which are formed in two pieces and releasably held in openings. The invention is particulary applicable to covers for electrical outlet boxes or the like and will be described with particular reference thereto. However, it will be appreciated that the invention has broader aspects and the cover may be used for closing openings in support members other than electrical outlet boxes.

Electrical outlet boxes of the general type shown in U.S. Pat. No. 3,701,837 issued Oct. 31, 1972, to Fork are commonly installed in spaced-apart locations in a floor, and have electrical wires installed therein. Use of any particular outlet box depends upon the location of equipment within the building.

Prior art relating to covers which can be opened or removed for providing access to outlet boxes or the like include U.S. Pat. No. 650,432 issued May 29, 1900, to Stewart who has hinged covers so there would always be an opening through the cover even if the box was not being used. Drilling holes and inserting pins for the hinged connections is relatively expensive.

U.S. Pat. No. 900,382 issued Oct. 6, 1908, to Joynes is simply of interest for a split cover-like member.

U.S. Pat. No. 1,857,377 issued May 10, 1932, to Hubbell is of interest for an outlet box cover which is releasably held in position by spring tabs.

U.S. Pat. No. 2,800,242 issued July 23, 1957, to Sauthoff is of interest for a split cover having openings for pipes or cables. The Sauthoff cover is held in position by bolts.

U.S. Pat. No. 3,015,408 issued Jan. 2, 1962, to Campbell et al is of interest for a plastic outlet box cover which is held in position by integral tabs on the undersurface of the cover.

U.S. Pat. No. 3,335,900 issued Aug. 15, 1967, to Mackiewicz is of interest for a switch box cover having integral fingers for snapping into slots for holding the cover in position.

The following U.S. Pat. Nos. are of interest for split plastic covers: 3,729,572 issued Apr. 24, 1973 to Helin; 3,859,454 issued Jan. 7, 1975, to Mann; and 3,864,512 issued Feb. 4, 1975, to Meadow.

It is also known to have a split cover generally similar to that of Sauthoff with integral tabs on the undersurfaces of the split cover parts like those shown at 24 in FIG. 6 of Campbell. Tabs of this type which are located on the undersurface of the cover and spaced inwardly from the cover outer peripheral edge are quite difficult to release for removing the cover from the outlet box.

SUMMARY OF THE INVENTION

An opening in a support member, such as a carpet ring for an electrical floor box, has an outer opening peripheral edge, a shoulder spaced inwardly from the opening peripheral edge, and an opening peripheral wall extending between the opening peripheral edge and the shoulder. A two-part cover positioned in the opening has the outer peripheral portion of its undersurface supported on the shoulder. The cover has a cover peripheral wall facing the opening peripheral wall, and the two parts of the cover have mating walls extending across the opening to define a joining line. Detents extending outwardly from the cover parts on opposite sides of the joining line are releasably received in recesses in the opening peripheral wall. The outer surfaces of the cover parts have rabbets formed therein adjacent the opposite ends of the joining line and receive abutments on the support member.

In one arrangement, the peripheral walls of the cover parts have notches therein closely adjacent the detents so that a screwdriver or other tool can be positioned in the notches for prying on the cover parts to snap the detents out of the recesses.

The detents are preferably spaced below the outer surface of the cover, and the thickness of the detents between their top and bottom surfaces is not greater than the distance from their top surfaces to the undersurface of a cover part. The detents preferably have smoothly rounded outer ends to facilitate snapping of same into and out of the recesses in the support member.

In a preferred arrangement, the opposite corners of each cover part are notched to define steps between a cover part mating wall and a cover part outer peripheral wall. The steps have first step edges extending inwardly from the peripheral wall generally parallel to the mating wall, and second step edges extending from the first step edges to intersection with the mating wall. The rabbets are in the outer surface of the cover parts adjacent the first step edges.

The support member and the cover parts are preferably each molded in one-piece of synthetic plastic material. The cover part preferably has a stiffening rib extending outwardly from the undersurface thereof. The stiffening rib has opposite end portions curving inwardly toward one another from the cover part mating wall and intersecting a central rib portion spaced inwardly from the mating wall. The central rib portion extends in a direction generally across the corners of a cover part.

The cover parts preferably have a plurality of weakened areas therein along the mating wall thereof. The weakened areas may be selectively removed to define openings through a cover member so that electrical cables and the like can be extended through the cover.

It is a principal object of the present invention to provide an improved cover for electrical floor boxes or the like.

It is another object of the invention to provide such a cover which can be easily removed for providing access to the box.

It is an additional object of the invention to provide such a cover which is easily replaced once it has been removed.

BRIEF DESCRIPTION OF THE DRAWING

FIG. 4 is a top plan view of a cover part which is cooperable with a like part to form a cover for the carpet ring of FIGS. 1-3;

FIG. 5 is a partial cross-sectional elevational view taken generally on line 5—5 of FIG. 4;

FIG. 6 is an end elevational view taken generally on line 6—6 of FIG. 4;

FIG. 7 is a bottom view taken generally on line 7—7 of FIG. 6;

DESCRIPTION OF A PREFERRED EMBODIMENT

Figure 1:
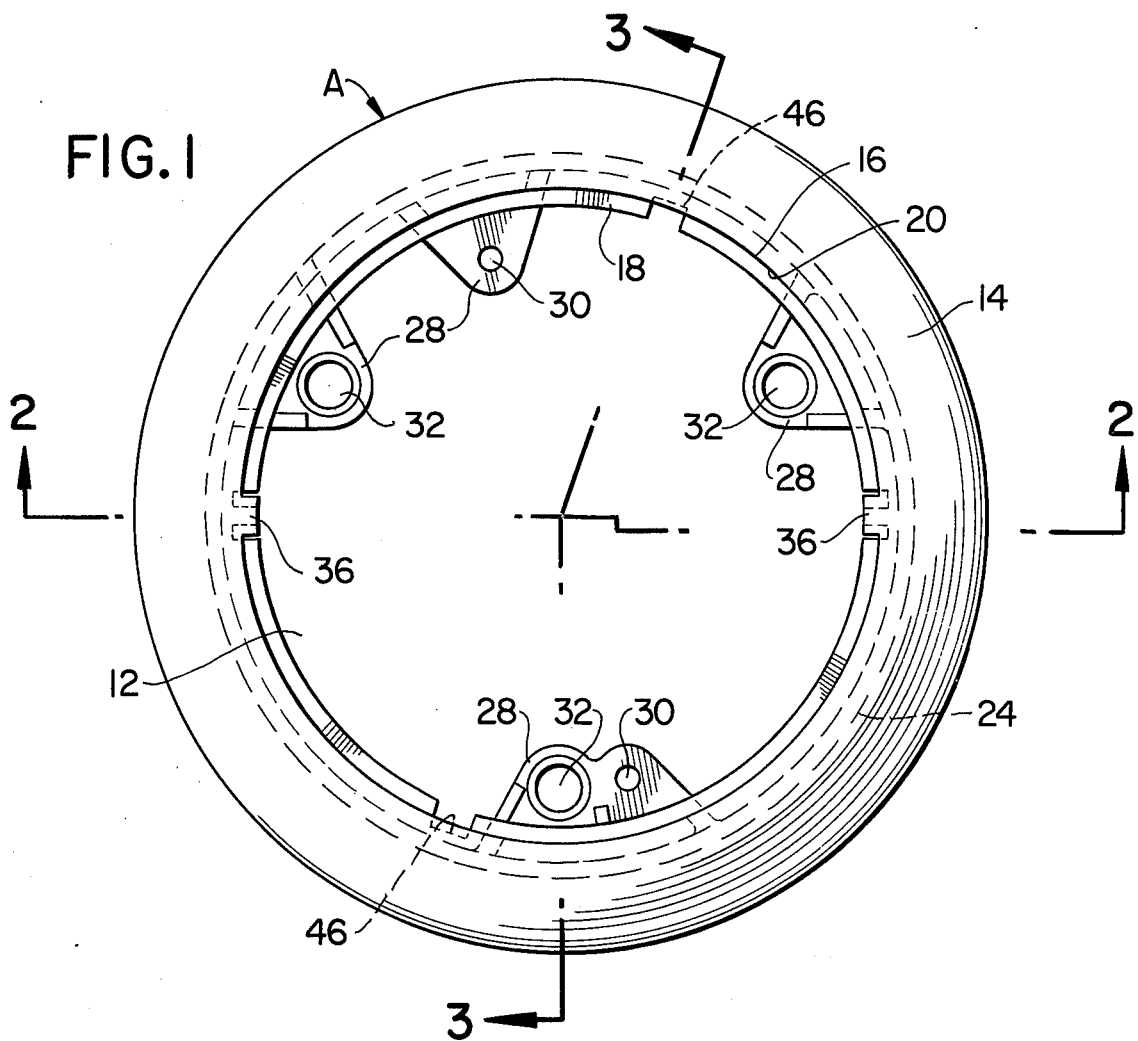
FIG. 1 is a top plan view of a carpet ring for an electrical floor box.
Figure 2:
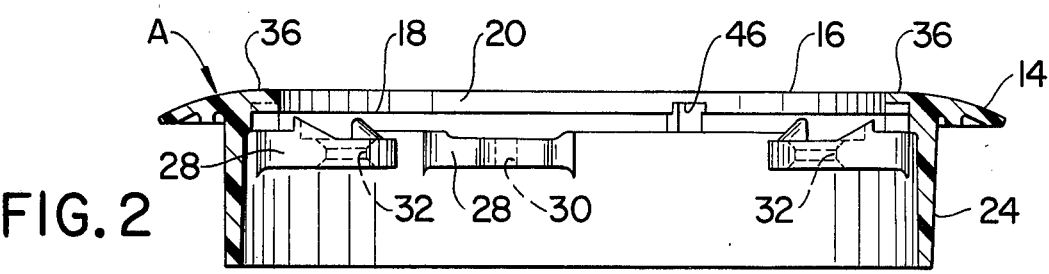
FIG. 2 is a cross-sectional elevational view taken generally on line 2—2 of FIG. 1.

With reference to the drawing, FIG. 1 shows a support member in the form of a carpet ring A having a generally circular opening 12 therein. Carpet ring A includes a generally circular flange 14 having an outer surface intersecting opening 12 to define an outer opening peripheral edge 16. A circumferential shoulder 18 extends inwardly of opening 12 and is spaced inwardly of opening 12 from opening peripheral edge 16. An opening peripheral wall 20 extends between shoulder 18 and opening peripheral edge 16.

A generally cylindrical wall 24 extends downwardly from flange 14 in outwardly-spaced relationship to shoulder 18. A plurality of circumferentially-spaced bosses 28 extend inwardly from cylindrical wall 24 below shoulder 18. Certain holes 30 in bosses 28 are adapted to receive screws which thread into tapped holes in an adjusting ring on an electrical floor box for securing carpet ring A thereto. Certain other holes 32 in bosses 28 have their undersurfaces resting on the heads of adjusting screws threaded into tapped holes in the adjusting ring. The adjusting screws are accessible through holes 32 with a screwdriver for leveling carpet ring A in a known manner.

Figure 3:
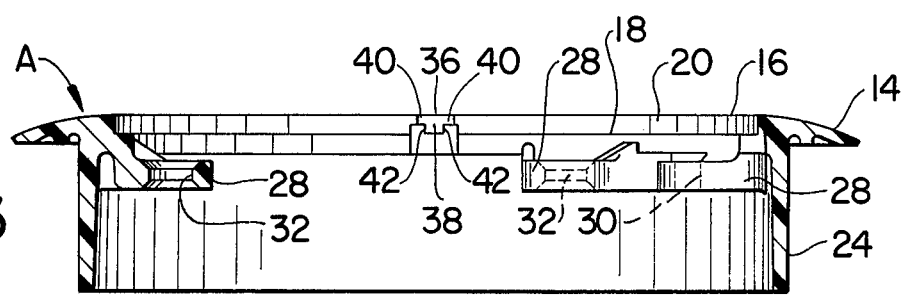
FIG. 3 is a cross-sectional elevational view taken generally on line 3—3 of FIG. 1.

Oppositely disposed abutments 36 extend inwardly from opening peripheral wall 20. As best shown in FIG. 3, each abutment 36 is generally T-shaped in an end elevational view. The outer surface of each abutment 36 lies in substantially the same plane as opening peripheral edge 16. Each abutment 36 has a centrally located substantially vertical main leg 38 and opposite generally horizontal flanges 40. Downwardly facing rabbets shown generally at 42 are defined between each abutment flange 40 and abutment main leg 38. The undersurface of each flange 40 is spaced above shoulder 18.

Oppositely disposed recesses 46 are formed in opening peripheral wall 20. Recesses 46 have top edges which are spaced above shoulder 18 and spaced below opening peripheral edge 16. Shoulder 18, and the material of carpet ring A on which such shoulder is formed, are omitted in alignment with recesses 46. Recesses 46 are located approximately 70° from an adjacent abutment 36. In other words, a diameter line across opening 12 perpendicular to a diameter line on which abutments 36 lie is displaced approximately 20° from the centerline diameter of recesses 46.

FIGS. 4–8 show a cover part B in the form of a generally flat member which cooperates with a like flat member to form a cover for opening 12 in carpet ring A. Flat member B has a mating straight wall 50 extending generally across generally opposite corners 52. Mating wall 50 is adapted to mate with a like wall on a like flat member to form a complete cover. An outer peripheral wall 54 extends around flat member B generally between opposite corners 52. Tab means in the form of a small detent 56 extends outwardly from outer peripheral wall 54 generally intermediate corners 52. Detent 56 is arcuately rounded in plan view as shown in FIG. 4, and is also smoothly rounded from top-to-bottom as shown in FIG. 5. An inwardly extending notch 58 is formed in outer peripheral wall 54 closely adjacent detent 56. Notch 58 provides an opening for receiving the tip of a screwdriver or other tool for prying a cover part upwardly for removal. Flat member B has an outer surface 60 and an undersurface 62. Detent 56 has a top surface spaced below outer surface 60 and has a bottom surface lying in substantially the same plane as undersurface 62. In other words, the distance from the top surface of detent 56 to the bottom surface thereof is not greater than the distance from the top surface of the detent to undersurface 62.

The opposite corners of flat member B are notched to define steps between mating wall 50 and outer peripheral wall 54. These steps include first step edges 66 extending inwardly from peripheral wall 54 generally parallel to mating wall 50. Second step edges 68 extend from first step edges 66 to intersection with mating wall 50. Rabbets as at 70 are formed in outer surface 60 adjacent edges 66. Flat member B has a thickness substantially the same as the distance from opening peripheral edge 16 to shoulder 18. The depth of rabbets 70 is substantially the same as the thickness of flanges 40 on abutments 36.

Flat member B has a plurality of spaced-apart weakened areas 74 along mating wall 50. These weakened areas are simply areas of substantially reduced thickness. The outer surfaces of the weakened areas simply form a continuation of outer surface 60, while the underside of each weakened area is spaced substantially inwardly from flat member undersurface 62. These weakened areas in effect define knockouts which can be selectively removed to define an opening through which electrical cables may extend when two cover parts are positioned with their mating walls substantially abutting. A stiffening rib extends outwardly from undersurface 62 of flat member B, and includes curved end portions 76 which curve inwardly toward one another from mating wall 50 to intersect a substantially straight central rib portion 78 spaced inwardly from mating wall 50 and extending substantially parallel thereto. Central rib portion 78 extends in a direction generally between opposite corners 52, and the entire stiffening rib is located slightly inwardly from weakened areas 74.

Figure 9:
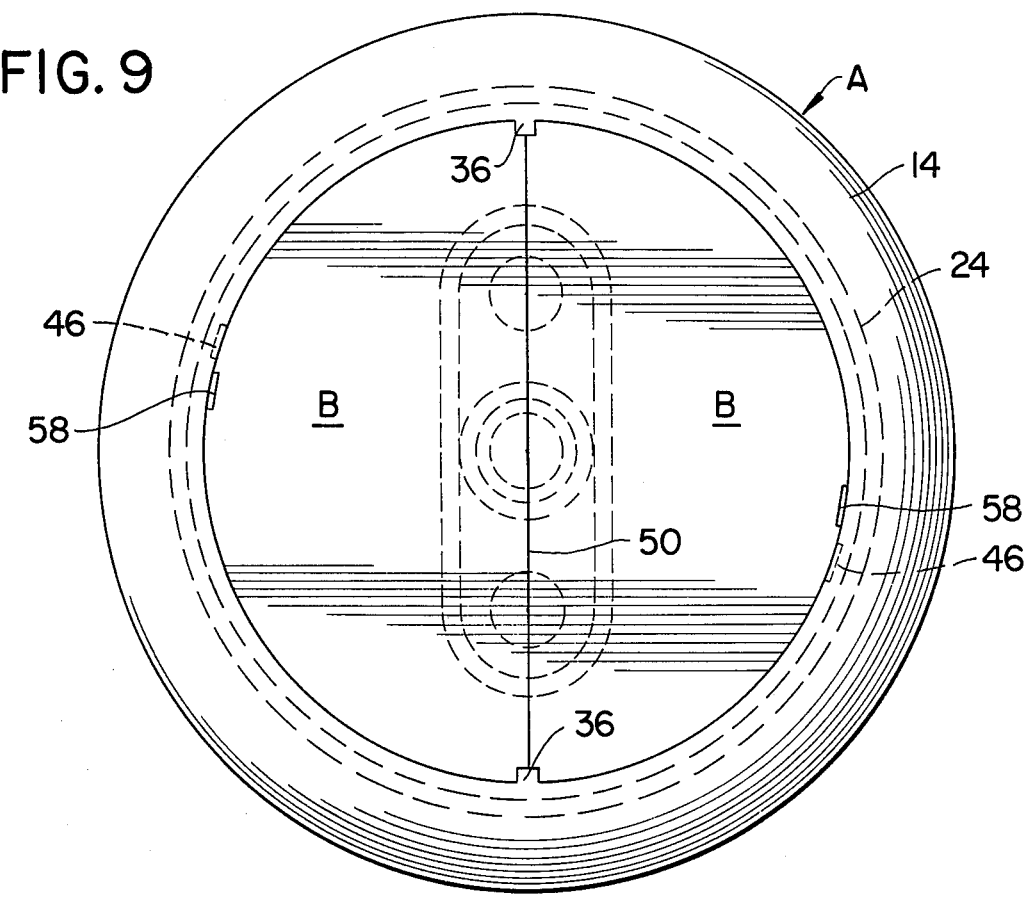
FIG. 9 is a top plan view of the carpet ring of FIGS. 1–3 having a cover installed thereon.
Figure 8:
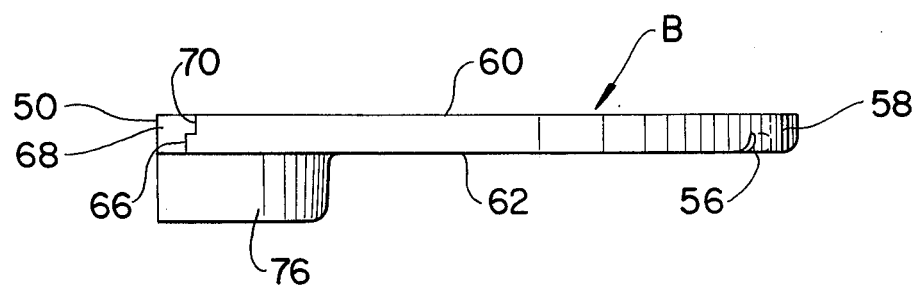
FIG. 8 is an elevational view taken generally on line 8—8 of FIG. 4.

A pair of flat members B are positionable within opening 12, with flanges 40 on abutments 36 received in rabbets 70 on the flat members. A downward pressing force applied to each flat member adjacent detent 56 will then cause detent 56 to snap into a recess 46 so that each cover part is releasably held in the opening. The outer peripheral portion of the undersurface of the cover part is supported on shoulder 18. Mating walls 50 of the two cover parts generally cooperate to define what may be termed a joining line shown at 50 in FIG. 9. The detents 56 are located generally on opposite sides of this joining line as are the recesses which receive such detents. The rabbets and abutments which hold the cover parts in the opening are located adjacent the opposite ends of joining line 50. The tip of a screwdriver or another tool may be placed within notches 58 for prying the cover parts upwardly to release detents 56 from recesses 46. Obviously, the thickness of abutment flanges 40 is approximately the same as the depth of rabbets 70. Also, the distance from a mating wall 50 to a step edge 66 is approximately the same as the width of abutment main leg 38. The carpet ring and cover parts are preferably each molded in one-piece of suitable synthetic plastic material. The material has sufficient yieldability, and detents 56 are small enough, to permit snapping of the detents in and out of the recesses for releasably holding the cover in the opening. The rounded outer end of the detent facilitates movement of a cover part between its locked and released positions.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A support member having an opening therein, said opening having an outer peripheral edge, a shoulder spaced inwardly from said opening peripheral edge, and an opening peripheral wall extending between said shoulder and said opening peripheral edge, a two-piece cover received in said opening and having outer and under surfaces, the outer peripheral portion of said undersurface being supported on said shoulder, said cover having a cover peripheral wall facing said opening peripheral wall, said cover being formed of two generally flat members having mating walls extending across said opening to define a joining line, said cover peripheral wall having detents extending outwardly therefrom on opposite sides of said joining line, said opening peripheral wall having recesses releasably receiving said detents, said flat members having rabbets in said outer surface at the opposite ends of said joining line, and inwardly extending abutments on said opening peripheral wall received in said rabbets.

2. The combination of claim 1 including inwardly extending notches in said cover peripheral wall closely adjacent said detents.

3. The combination of claim 1 including weakened areas in said flat members along said mating walls, and a stiffening rib extending outwardly from the undersurface of each flat member, said rib having curved end portions extending inwardly from said mating wall toward one another and merging into a straight rib portion extending generally parallel to said joining line.

4. A support member having an opening therein receiving a separable cover defined by a pair of cooperating generally flat cover members, each said cover member having outer and under surfaces and generally opposite corners, a mating wall extending generally across said corners for mating with a like mating wall on a like flat member, a peripheral wall extending around said flat member generally between said corners, tab means extending outwardly from said peripheral wall intermediate said corners for reception in a recess to releasably lock said cover members in an opening, a rabbet in said outer surface adjacent at least one of said corners, said opening in said support member having an outer opening peripheral edge, a shoulder spaced inwardly from said opening peripheral edge, and an opening peripheral wall between said shoulder and said opening peripheral edge, and recesses in said opening peripheral wall below said opening peripheral edge, abutment means extending inwardly of said opening from said opening peripheral wall in spaced relationship to said shoulder for reception in said rabbet on each said flat member, said cover having its outer peripheral undersurface portion supported on said shoulder with said tab means releasably received in said recesses and said abutment means received in said rabbets for releasably holding said cover in said opening.

5. The combination of claim 4 wherein said tab means comprises a relatively small detent, and an inwardly extending notch in said outer peripheral wall of each said flat member closely adjacent said detent, whereby a tool is receivable in said notch to pry said flat members in a direction for releasing said detents from said recesses.

6. A half part cooperable with a like half part to form a cover for an opening in a support member or the like comprising; a generally flat member having outer and under surfaces and generally opposite corners, a mating wall extending generally across said corners for mating with a like mating wall on a like flat member, a peripheral wall extending around said flat member generally between said corners, tab means extending outwardly from said peripheral wall intermediate said corners for reception in a recess to releasably lock said flat member in an opening, and a rabbet in said outer surface adjacent at least one of said corners for receiving a projection to aid in releasably locking said flat member in an opening.

7. A half part cooperable with a like half part to form a cover for an opening in a support member or the like comprising; a generally flat member having outer and under surfaces and generally opposite corners, a mating wall extending generally across said corners for mating with a like mating wall on a like flat member, a peripheral wall extending around said flat member generally between said corners, tab means extending outwardly from said peripheral wall intermediate said corners for reception in a recess to releasably lock said flat member in an opening, each said corner being notched to define steps between said mating wall and said peripheral wall, said steps having first step edges extending inwardly from said peripheral wall generally parallel to said mating wall and second step edges extending from said first step edges to intersection with said mating wall, and a rabbet in said outer surface adjacent each said first step edge for receiving a projection to aid in releasably locking said flat member in an opening.

* * * * *